(12) United States Patent
Banerjee et al.

(10) Patent No.: US 9,552,649 B2
(45) Date of Patent: Jan. 24, 2017

(54) INTEGRATED PHENOTYPING EMPLOYING IMAGE TEXTURE FEATURES

(71) Applicant: KONINKLIJKE PHILIPS N.V., Eindhoven (NL)

(72) Inventors: Nilanjana Banerjee, Armonk, NY (US); Nevenka Dimitrova, Pelham Manor, NY (US); Vinay Varadan, New York, NY (US); Sitharthan Kamalakaran, Pelham, NY (US); Angel Janevski, New York, NY (US); Sayan Maity, Miami, FL (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/443,786

(22) PCT Filed: Oct. 25, 2013

(86) PCT No.: PCT/IB2013/059663
§ 371 (c)(1),
(2) Date: May 19, 2015

(87) PCT Pub. No.: WO2014/080305
PCT Pub. Date: May 30, 2014

(65) Prior Publication Data
US 2015/0310632 A1    Oct. 29, 2015

Related U.S. Application Data

(60) Provisional application No. 61/728,441, filed on Nov. 20, 2012.

(51) Int. Cl.
*G06K 9/00* (2006.01)
*G06T 7/40* (2006.01)
(Continued)

(52) U.S. Cl.
CPC ............. *G06T 7/404* (2013.01); *G06K 9/6267* (2013.01); *G06T 2207/10088* (2013.01); *G06T 2207/30068* (2013.01)

(58) Field of Classification Search
USPC ................ 382/100, 103, 106–107, 108, 123, 382/128–134, 154, 162, 168, 173, 181, 382/199, 209, 219, 224, 232, 254, 274, 382/276, 286–291, 305, 312; 702/19; 435/6.16; 378/4, 21
See application file for complete search history.

(56) References Cited

U.S. PATENT DOCUMENTS

2007/0099219 A1*  5/2007  Teverovskiy ....... G06F 19/3437
                                                                        435/6.16
2008/0195322 A1*  8/2008  Altschuler .............. G06F 19/24
                                                                        702/19

(Continued)

FOREIGN PATENT DOCUMENTS

WO      2009105530 A2    8/2009

OTHER PUBLICATIONS

Nie, Ke et al "Quantitative Analysis of Besion Morphology and Texture Features for Diagnostic Prediction in Breast MRI", Academic Radiology, vol. 15, No. 12, Dec. 2008, pp. 1513-1525.

(Continued)

*Primary Examiner* — Seyed Azarian

(57) ABSTRACT

Image texture feature values are computed for a set of image texture features from an image of an anatomical feature of interest in a subject, and the subject is classified respective to a molecular feature of interest based on the computed image texture feature values. The image texture feature values may be computed from one or more gray level co-occurrence matrices (GLCMs), and the image texture features may include Haralick and/or Tamura image texture features. To train the classifier, reference image texture feature values are computed for at least the set of image texture features from images of the anatomical feature of (Continued)

Figure 1:
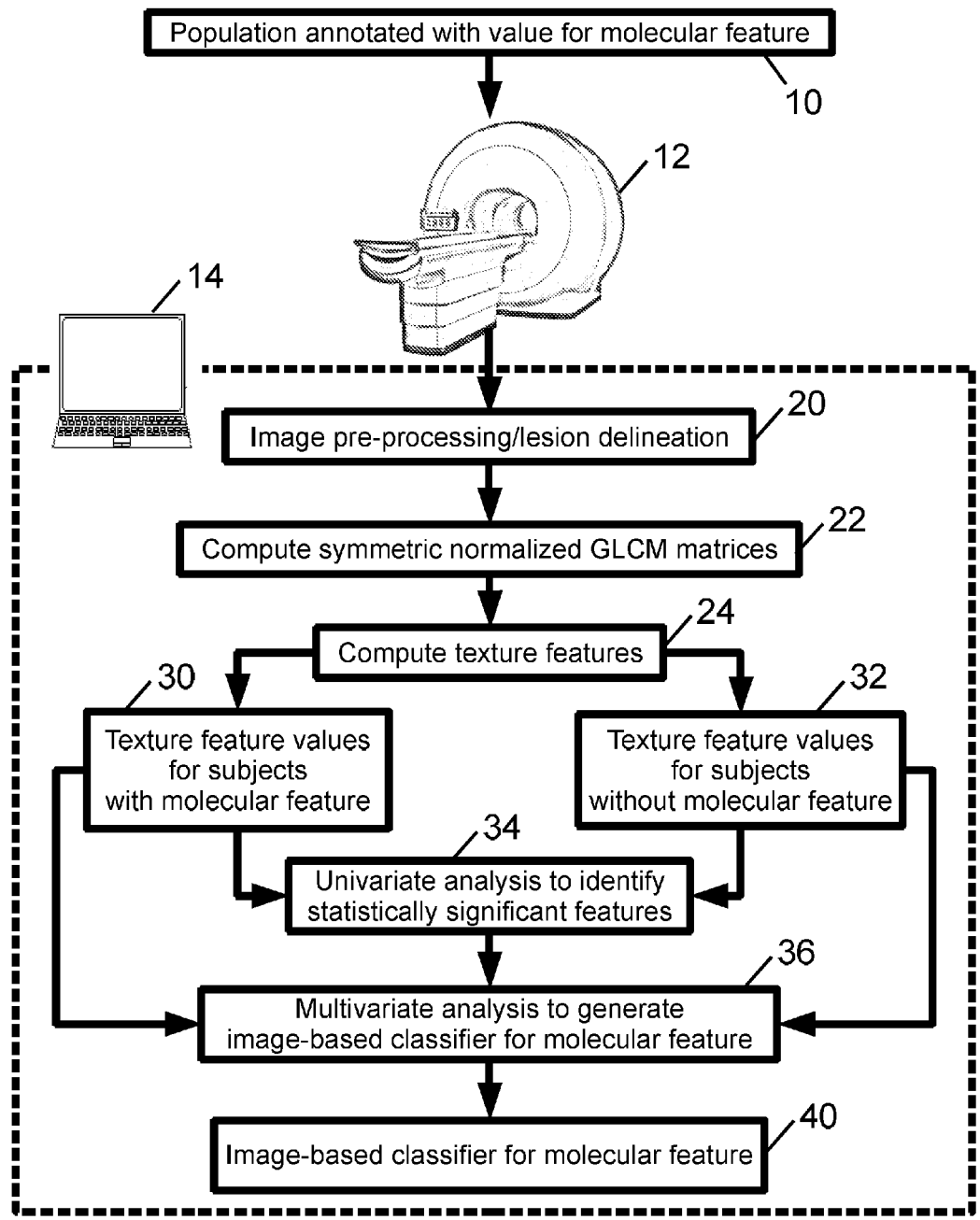

interest in reference subjects. The reference image texture feature values are divided into different population groups representing different values of the molecular feature of interest, and the classifier is trained to distinguish between the different population groups based on the reference image texture feature values.

17 Claims, 2 Drawing Sheets

(51) Int. Cl.
*G06K 9/62* (2006.01)
*A61B 6/00* (2006.01)

(56) References Cited

U.S. PATENT DOCUMENTS

| | | | | |
|---|---|---|---|---|
| 2008/0310692 | A1* | 12/2008 | Robinson | G06K 9/0014 382/128 |
| 2011/0026798 | A1* | 2/2011 | Madabhushi | G01R 33/56 382/131 |
| 2012/0177280 | A1* | 7/2012 | Zhukov | G01N 33/5076 382/133 |

OTHER PUBLICATIONS

Segal, Eran et al "Decoding Global Gene Expression Programs in Liver Cancer by Noninvasive Imaging" Nature Biotechnology, vol. 25, No. 6, Jun. 2007, pp. 675-680.

Haralick, Robert M. et al "Textural Features for Image Classification", IEEE Transactions on Systems, Man, and Cybernetics, Nov. 1973, pp. 610-621.

Tamura, Hideyuki et al "Textural Features Corresponding to Visual Perception", IEEE Transactions on Systems, Man, and Cybernetics, vol. SMC-8, No. 6, Jun. 1978, pp. 460-473.

Yamamoto, Shota et al "Radiogenomic Analysis of Breast Cancer using MRI: A Preliminary Study to Define the Landscape", Nuclear Medicine and Molecular Imaging Original Research, Vo. 199, Sep. 2012, pp. 654-663.

Gevaert et al"Non-Small Cell Lung Cancer: Identifying Prognostic Imaging Biomarkers by Leveraging Public Gene Expression Microarray Data methods and preliminary Results", Radiology, vol. 264, No. 2, pp. 387-396, Aug. 2012.

Rutman, Aaron et al "Radiogenomics: Creating a Link Between Molecular Diagnistics and Diagnostic Imaging" Eur J Radiology, vol. 70. No. 2, pp. 232-241.

Sebe, Nicu et al Texture Features for Content-Based Retrieval, Chapter in Principles of Visual Information Retrieval, Jan. 2001, pp. 51-86.

Howarth, Peter et al "Evaluation of Texture Features for Content-Based Image Retrieval", CIVR 2004, LNCS 3115, pp. 326-334.

Delibasis, Konstantinos et al "Designing Texture Filters with Genetic Algorithms: An Application to Medical Images", Signal Procesing, vol. 57, 1997, pp. 19-33.

Malich, Ansgar et al "Potential MRI Interpretation Model: Differentiation of Benigh From Malignant Breast Masses", Breast Imaging, Clinical Observations, AJR 185, Oct. 2005, pp. 964-970.

\* cited by examiner

INTEGRATED PHENOTYPING EMPLOYING IMAGE TEXTURE FEATURES

CROSS-REFERENCE TO PRIOR APPLICATIONS

This application is the U.S. National Phase application under 35 U.S.C. §371 of International Application No. PCT/IB2013/059663, filed on Oct. 25, 2013, which claims the benefit of U.S. Provisional Patent Application No. 61/728,441, filed on Nov. 20, 2012. These applications are hereby incorporated by reference herein.

The following relates to the genetic analysis arts, medical arts, and to applications of same such as the medical arts including oncology arts, veterinary arts, and so forth.

Genomic analysis of various human tissues has led to a better understanding of cellular pathways and various pathological conditions on a biomolecular level. Analysis of different cancerous tissues in relation to samples of normal tissue has permitted an enhanced understanding of tumorigenic processes and aided in improved staging and sub-classification of various malignancies. Numerous studies have also shown that gene expression signatures, which may include one, a few, dozens, or hundreds of genes, can significantly improve diagnostic classification, prognostication and prediction of therapeutic response in cancer.

In a clinical setting, genomic analysis can be used to characterize a lesion. However, doing so entails acquiring tissue from the lesion through invasive biopsy. The procedure is not appropriate for some cancer patients, who are often in a weakened physical condition, since it introduces physical and psychological stress and introduces the potential for infection at the biopsy site.

In contrast to genomic studies, imaging studies are part of routine clinical care. Medical imaging using techniques such as magnetic resonance (MR), computed tomography (CT), and so forth, is generally non-invasive (although an intravenous contrast agent may be administered) and has gained wide acceptance among both medical practitioners and patients. Imaging can provide important anatomical and morphological information. In modalities such as positron emission tomography (PET), functional information can also be obtained.

Integrated phenotyping refers to techniques in which radiology data (i.e. medical images) are correlated with genomic data (e.g., genetic sequencing data, microarray data, et cetera). See, e.g. Gevaert et al., "Non-small cell lung cancer: identifying prognostic imaging biomarkers by leveraging public gene expression microarray data—methods and preliminary results", Radiology vol. 264(2) pages 387-96 (August 2012); Rutman et al., "Radiogenomics: creating a link between molecular diagnostics and diagnostic imaging", Eur J Radiol. Vol. 70(2) pages 232-41 (2009); Segal et al., "Decoding global gene expression programs in liver cancer by noninvasive imaging", Nat Biotechnol. vol. 25(6) pages 675-80 (2007). In integrated phenotyping techniques, specific tumor imaging phenotypes serve as proxy for gene expression signatures, informing a non-invasive yet accurate diagnosis of tumor subtype and molecular biology.

The following contemplates improved apparatuses and methods that overcome the aforementioned limitations and others.

According to one aspect, a non-transitory storage medium stores instructions executable by an electronic data processing device to perform a method including: computing image texture feature values for a set of image texture features from an image of an anatomical feature of interest in a subject; and classifying the subject respective to a molecular feature of interest based on the image texture feature values computed for the set of image texture features. The computing of the image texture feature values may include computing one or more gray level co-occurrence matrices (GLCMs) for the image of the anatomical feature of interest in the subject, and computing the image texture feature values based on the one or more GLCMs. The set of image texture features may include Haralick and/or Tamura image texture features, or Gabor features or wavelet subband features. The method may further include: computing reference image texture feature values for at least the set of image texture features from images of the anatomical feature of interest in reference subjects of a reference population; dividing the reference image texture feature values into different population groups representing different values of the molecular feature of interest based on known values of the molecular feature of interest for the reference subjects; and training a classifier used in the classifying to distinguish between the different population groups based on the reference image texture feature values.

According to another aspect, an apparatus comprises a non-transitory storage medium as set forth in the immediately preceding paragraph, and an electronic data processing device configured to execute instructions stored on the non-transitory storage medium.

According to another aspect, a method (suitably performed by an electronic data processing device) comprises: computing reference image texture feature values for a plurality of image texture features from images of an anatomical feature of interest in reference subjects of a reference population; dividing the reference image texture feature values into different population groups representing different values of a molecular feature of interest based on known values of the molecular feature of interest for the reference subjects; and training a classifier to distinguish between the different population groups based on the reference image texture feature values. The computing of reference image texture feature values may comprise computing one or more gray level co-occurrence matrices (GLCMs) for each image, and computing the reference image texture feature values based on the one or more GLCMs. The plurality of image texture features may include at least one of Haralick image texture features and Tamura image texture features. The training may include: performing univariate analysis for each image texture feature of the plurality of image texture features to quantify the statistical significance of each image texture feature for distinguishing between the different population groups; selecting a significant sub-set of image texture features of the plurality of image texture features having the highest statistical significance; and training the classifier using only the significant sub-set of image texture features. The method may further comprise: computing image texture feature values for at least some of the plurality of image texture features from an image of the anatomical feature of interest in a test subject, and classifying the test subject respective to the molecular feature of interest using the trained classifier.

In the foregoing aspects, the anatomical feature of interest may be a lesion, e.g. a breast lesion, and the molecular feature of interest may be a hormone receptor marker, e.g. an estrogen receptor (ER) marker or a progesterone receptor (PR) marker. In the foregoing aspects, the images may be magnetic resonance (MR) images. In the foregoing aspects, the subjects may be human subjects, e.g. patients, or veterinary subjects (e.g. dogs or cats).

One advantage resides in noninvasively identifying a molecular feature in tissue based on a combination of texture features.

Another advantage resides in providing a generic approach for developing a classifier to classify tissue respective to a molecular feature based on imaging data.

Numerous additional advantages and benefits will become apparent to those of ordinary skill in the art upon reading the following detailed description.

The invention may take form in various components and arrangements of components, and in various process operations and arrangements of process operations. The drawings are only for the purpose of illustrating preferred embodiments and are not to be construed as limiting the invention.

FIG. 1 diagrammatically shows a system for developing a classifier to classify tissue respective to a molecular feature based on imaging data.

Figure 2:
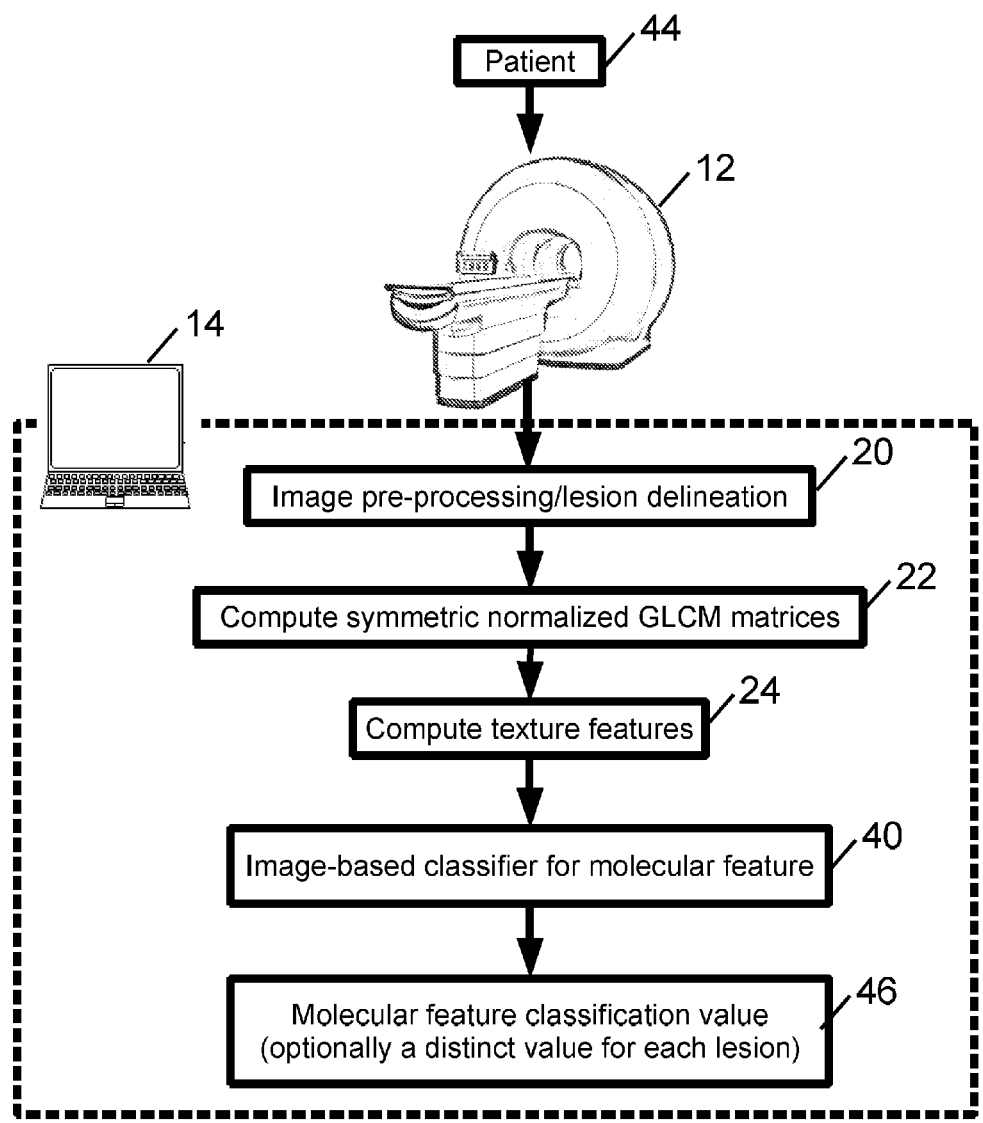

FIG. 2 diagrammatically shows a system for identifying a molecular feature in tissue based on a combination of texture features.

Disclosed herein are integrated phenotyping techniques that employ texture features, e.g. computed from a gray level co-occurrence matrix (GLCM) generated from an image of the lesion or a portion of an image of the lesion. A texture feature is an intensive property (usually averaged over an area or volume), and accordingly is not dependent (except for statistical variations) on the size or shape of the lesion in the image. A large number of different texture features can be rapidly computed. A texture of a medical image represents spatial variation on a size scale that is larger than the image resolution (pixel or voxel size), which is typically of order millimeters in medical images acquired by magnetic resonance (MR), computed tomography (CT), or other conventional medical imaging techniques. Thus, the spatial scale of image texture is orders of magnitude larger than the size of the gene, protein, or other molecular feature of interest.

Surprisingly, however, the inventors have found that some image texture features exhibit statistically significant correlation with molecular features. Furthermore, the inventors have found that the strength of statistical correlation between an image texture feature and a given molecular feature varies widely amongst different image texture features. In experiments conducted by the inventors, the molecular feature-image texture feature correlation as measured by a statistical significance (p-value computed using the Wilcoxon rank-sum test) varies by more than an order of magnitude amongst various features of the Haralick texture feature set. Without being limited to any particular theory of operation, it is believed that this texture-molecular feature correlation is a consequence of an impact of the molecular feature on the small-scale spatial structure (local environment) of the lesion tissue. Because this small-scale spatial structure can have various characteristics (e.g. symmetries, anisotropies, periodicities, patterns, size scales, et cetera) depending upon the particular molecular feature, the correlation strength between the molecular feature and the various image texture features varies.

In view of the foregoing, it is disclosed herein to develop and utilize in medical diagnostics a classifier for classifying a lesion with respect to a molecular feature based on values of a set of discriminative image texture features.

With reference to FIG. 1, an illustrative system for developing such a classifier is described. Reference subjects of a population 10 of reference subjects are imaged using a magnetic resonance (MR) scanner 12 (a Philips Achieva 1.5T MR scanner is illustrated, available from Koninklijke Philips Electronics NV, Eindhoven, the Netherlands, but other MR scanners are suitable). The reference subjects of the population 10 have undergone suitable diagnostic tests to determine whether each reference subject has the molecular feature or does not have the molecular feature. (More generally, the value of the molecular feature of interest is known for each reference subject of the population 10). By way of illustrative example, the reference subjects can be women with breast lesions who have undergone biopsies, and the molecular feature of interest can be a breast cancer marker such as the estrogen receptor (ER) marker, directly assessed by a microarray analysis, polymerase chain reaction (PCR) based tests, genetic (DNA or RNA) sequencing, histopathology analysis, or so forth performed on the biopsy (or surgical) samples. In general, the molecular feature of interest may be an individual gene, a group of genes, a gene pathway activation, a noncoding RNA, multiple RNAs, or single nucleotide polymorphism or copy number polymorphism, or epigenetic polymorphism or so forth. In medical applications, the reference subjects of the population 10 are human reference subjects; however, the disclosed techniques are alternatively applicable in veterinary practice, in which case the reference subjects are suitably reference dogs, reference cats, or so forth.

For each reference subject of the population 10, the output of the MR scanner 12 is a medical image (or set of medical images) of the lesion (or, more generally, of an anatomical feature of interest in the reference subject). It is to be understood that the illustrative MR scanner 12 includes electronics for reconstructing the "raw" acquired imaging data (e.g., k-space samples in the case of typical MR imaging, or projection data in the case of computed tomography, et cetera) to generate a medical image, and that these electronics may also perform post-reconstruction image processing. While the illustrative examples set forth herein employ MR imaging, or dynamically contrast enhanced MRI, it is contemplated to employ another imaging modality such as computed tomography (CT) imaging. Optionally, the imaging may be performed in conjunction with an administered exogenous contrast agent. It is also to be appreciated that in some embodiments the medical images of the various reference subjects of the population 10 may be acquired by two or more different MR scanners.

With continuing reference to FIG. 1, the resulting images are input to a computer or other electronic data processing device 14 that performs processing as diagrammatically shown in FIG. 1 and as described herein. The computer or other electronic data processing device 14 may be an integral component of the MR scanner 12, for example the same hardware that performs the image reconstruction; alternatively, the computer or other electronic data processing device 14 may be distinct from the MR scanner 12. The processing performed optionally starts with various pre-processing and/or image segmentation operations 20. Typically, the region of the image corresponding to the lesion is identified or delineated using an automated segmentation algorithm and/or by manual contouring of the lesion. The subsequent processing is suitably performed only on the identified/delineated image portion corresponding to the lesion. Additional pre-processing optionally includes quantizing the gray levels to reduce the total number of gray levels (for example, an image having 16-bit gray levels with values ranging from 0-65,535 may be quantized to 8-bit gray levels with values ranging from 0-255). This processing 20 is performed for each image of the population 10. Each image is also tagged or otherwise associated with the value of the molecular feature for the imaged person.

In the illustrative embodiment, texture features for each image portion corresponding to the lesion are computed based on a gray level co-occurrence matrix (GLCM), which is computed in operation 22. The GLCM is a matrix whose elements store counts of the number of occurrences of corresponding spatial combinations of pixel (or voxel) values. For example, a suitable GLCM for a two-dimensional image with 8-bit pixel values (ranging from 0-255) is suitably a 256×256 matrix where element (i, j) stores the count of occurrences of the spatial combination of a pixel of value i "next to" a pixel of value j. (The value of performing quantization is manifest here, since the original image with 16-bit gray levels would employ a 65,536×65,536 GLCM having 4 billion elements, compared with 65,536 elements for the 256×256 GLCM of the quantized image or subimage). Various GLCM can be defined depending on the choice of spatial relationship for "next to" (e.g., immediately to the right, immediately above, diagonal) and depending on the choice of distance between the pixels of values i and j (immediately adjacent, or separated by one, two, three, or more intervening pixels). In some nomenclatures, the pixel i is referred to as the reference pixel, the pixel j is referred to as the neighbor pixel, the distance between pixels i and j is referred to as the offset (e.g., a one-pixel offset in the case of immediately adjacent, a two-pixel offset if there is one intervening pixel, and so forth). It is also contemplated to employ a GLCM in which the matrix elements store counts of more complex spatial arrangements.

For texture calculations, the GLCM is typically symmetrized, for example by storing in matrix element (i, j) the count of all elements with the values (i, j) and with values (j, i), and also storing the same count in matrix element (j, i). Other symmetrization approaches are contemplated—the result of the symmetrization is that the value of matrix element (i, j) equals the value of the matrix element (j, i). For texture calculations, the GLCM is also typically normalized so that the value of each matrix element (i, j) represents the probability that the corresponding combination (i, j) (or its symmetrized version (i, j) or (j, i)) occurs in the image for which the GLCM is computed.

The operation 22 may compute a single GLCM, or may compute two or more GLCMs. For example, in one embodiment four symmetrized and normalized GLCMs are computed—one for the horizontal arrangement with offset=1, one for the vertical arrangement with offset=1, one for the diagonal arrangement "/" with offset=1, and one for the diagonal arrangement "\" with offset=1. Additional or alternative GLCMs may be computed for different offsets (e.g. offset=2) and/or for additional spatial arrangements. In general there are at least three different categories of texture features: probability density function models, gross shape models, and partial models ("Texture Features for Content-based Retrieval"—Nicu Sebe and Michael S. Lew, chapter in: Principles of Visual Information Retrieval, Springer, ISBN 1-852333-381-2, pp. 51-86, January, 2001, http://staffscience.uva.n1/~nicu/publications/texture chapter.pdf). The probability density function models include 1) parametric methods such as Gauss-markov random field, Clique Markov Random field, Wold features and 2) nonparametric methods such as gray level co-occurrence methods which measure local interaction of intensity values of pairs of pixels. Gross shape methods include, e.g. harmonic (autocorrelation and Fourier power spectrum that measure periodicity) or primitive (early, Gabor and mathematical morphology) methods. Partial methods embody fractals and lines to evaluate texture while primitive methods detect a set of spatially compact perceptual features such as lines, edges, and intensity extrema. The illustrative examples employ certain illustrative texture features; however, the same methodology applies to all the categories of texture models outlined above. In an operation 24, image texture feature values for a set of image texture features are computed based on the one or more GLCMs. Various texture features can be computed. In some embodiments, the set of texture features includes one or more texture features of the Haralick set of texture features (see, e.g. Haralick et al., "Textural Features for Image Classification", IEEE Transactions on Systems, Man and Cybernetics vol. SMC-3 No. 6 pp. 610-621 (1973) are computed in the operation 24. As another example, one or more texture features of the Tamura texture features set may be computed. See, e.g. Howarth et al., "Evaluation of Texture Features for Content-Based Image Retrieval", P. Enser et al. (Eds.): CIVR 2004, LNCS 3115, pp. 326-334 (2004). Other texture features computed from the GLCMs are also contemplated. It is also to be appreciated that in embodiments in which two or more GLCMs are computed in operation 22, the same texture feature can be computed for each GLCM, thus generating effectively different texture features of the same type but for different GLCMs. (By way of illustrative example, if twelve Haralick features are computed for each of four different GLCMs (e.g. horizontal, vertical, and two opposite diagonal arrangements) then this provides 48 texture features in all.

These texture features are intensive properties of the lesion image, and do not depend upon the size or shape of the lesion in the medical image. The GLCM is computed by counting spatial arrangement occurrences over the image, thus effectively averaging over the image. Textual features computed using GLCMs of different spatial arrangements provides the ability to capture small-scale spatial structure having different anisotropy or symmetry directions. Textual features computed using GLCMs of different offset values provides the ability to capture small-scale spatial structure having different spatial scales. Moreover, the different texture feature types, e.g. the different texture features of the Haralick set, capture various visual, statistical, informational, and/or correlative aspects of the texture. Thus, the set of textual features output by the operations 22, 24 contains a wealth of information about the small-scale spatial structure of the lesion.

On the other hand, there is no apparent reason to expect a given molecular feature to introduce a particular small-scale spatial structure captured by the image, and so there is no a priori reason to expect any particular texture feature to correlate with any particular molecular feature. Indeed, it is not apparent that a given molecular feature of interest, such as a molecular feature associated with breast cancer, should have any impact on the small-scale spatial structure at all. As disclosed herein, it is found experimentally that there is some molecular feature-image texture feature correlation in the case of some molecular features and for some image texture features.

With continuing reference to FIG. 1, the image texture feature values generated by operations 22, 24 for the set of image texture features are therefore used to empirically discover discriminative texture features, and to generate a classifier employing a discriminative combination of texture features to classify tissue respective to a molecular feature of interest. Toward this end, the tagged or otherwise-known molecular feature values for the reference subjects of the population 10 are used to divide the image texture feature values generated by operations 22, 24 into two population groups: (1) a population group 30 including image texture feature values for reference subjects with the molecular feature of interest (e.g. ER+ in one illustrative example of breast cancer patients); and (2) a population group 32 including image texture feature values for reference subjects without the molecular feature of interest (e.g. ER−).

Univariate analysis 34 is employed to identify discriminative texture features that are effective to discriminate between the two population groups 30, 32. In a suitable approach, for each image texture feature, a statistical significance test is performed. A null hypothesis is assumed that the texture feature under analysis is not discriminative, and a statistical hypothesis test such as a Wilcoxon rank-sum test or a student-t test is performed to generate a p-value indicative of the probability that the values of the image texture feature under analysis would have the distribution exhibited in population groups 30, 32 if this null hypothesis was true. A lower value of the p-value indicates lower likelihood of observing the values distribution of population groups 30, 32 if the texture feature is not correlated with the molecular feature (ER+ versus ER− in the foregoing example), or conversely a low value of the p-value indicates the image texture feature under analysis is discriminative for the molecular feature of interest.

Multivariate analysis 36 is employed to generate an image-based classifier 40 for the molecular feature. The multivariate analysis 36 suitably employs a set of statistically significant image texture features identified by the univariate analysis 34. Various approaches for training a classifier can be employed, e.g. support vector machine (SVM), neural network, genetic algorithms, or so forth. The output of the multivariate analysis 36 is a classifier operating on the set of statistically significant image texture features. The multivariate analysis 36 generates the classifier 40 which distinguishes between the population groups 30, 32 whose reference subjects have different respective values for the molecular feature of interest. The molecular feature, i.e. phenotype may be characterized by the state of expression of a single gene (e.g. ESR1 for determining ER positivity), or by the status of activation of a certain pathway (e.g. all the target genes of the ESR1 gene as the readout of the estrogen receptor (ER) pathway activation). A biological pathway may be represented as a set of nodes (e.g. genes) and interactions that describe the functional relationships among these nodes. The molecular feature may also be characterized by the status of activation of noncoding RNAs or a whole network of RNAs, or so forth.

Some illustrative implementations of the multivariate analysis 36 are as follows.

In one approach, the multivariate analysis 36 is based on a combination of top significant features from the univariate analysis 34. Hierarchical or non-hierarchical (i.e. "flat") clustering may be performed using all calculated texture features, or using a single significant feature with best p-value, or using a set of significant features with a "top-N" p-values, e.g. the top 3-4 significant features. To minimize the within cluster-dispersions, gap statistics can be employed. In some embodiments, the clustering determines the optimal number of clusters for the data. Alternatively, a clustering approach having a priori-fixed number of clusters can be used. To determine enrichment of a particular class within a cluster of patients a hyper-geometric test can be used.

In another approach, the multivariate analysis 36 employs a supervised learning method, with feature ranking and selection using a classifier (e.g. SVM, neural network, or so forth). The classes are determined by gene expression, for example, into ER+ and ER−, or into CDKN2A+ and CDKNA2−, or so forth. Based on the labels of samples within this classification, imaging features are ranked, optionally using cross-validation (e.g., using three-fold cross-validation). Using the highest ranking features, the classifier 40 is trained to classify the imaging data into classes ER+ and ER− (or into CDKNA+ and CDKNA−, et cetera). Cross-validation, if used, reduces variability of classifier performance. The validation results are averaged over the rounds of cross-validation. A single round of cross-validation involves dividing a dataset into complementary subsets, then performing the classification on one of the subsets (training set) and validating the classification on the other subset (testing set). For each such division of the data, a model is fitted to the training data, and then predictive accuracy is assessed using the testing data. It is also contemplated to employ an outer loop that sets aside a subset of the data for validation.

In another approach, the multivariate analysis 36 employs feature selection by a genetic algorithm or SVM approach. A genetic algorithm (GA)-based tool automatically evolves a subset of features that best predicts the ground truth labeling of the samples. (Note that in this case the univariate analysis 34 may be omitted).

In yet another approach, the multivariate analysis 36 employs correlation between molecular and imaging features. Each image texture feature is correlated with each of the molecular features to select the highest-correlating pair or pairs of imaging and genomic features for use as the classifier 40.

These are merely illustrative examples, and other multivariate analysis approaches can be employed, depending upon the type of classifier to be trained (e.g., binary classifier or multi-class classifier; flat classifier or hierarchical classifier; et cetera) and other design factors such as the (maximum) number of image texture features desired for use in the classification operation (see FIG. 2). It is also contemplated to bias the feature selection of operations 34, 36 toward minimizing the total number of GLCMs computed during the classification phase. For example, one approach is to compute the top-N most statistically significant image texture features without regard to which GLCMs source the top-N texture features, and then select a top-K sub-set of the top-N features (where K<N, e.g. K=0.5N or K=0.25N) that minimize the number of GLCMs needed to generate the top-K features.

With reference to FIG. 2, the binary classifier 40 can be employed to classify a patient 44 respective to the molecular feature (ER+ or ER− in the illustrative example). The MR scanner 12 (or another MR scanner) images the patient 44 to generate medical images which are pre-processed and a lesion of interest delineated using the same operation(s) 20 as were used on the medical images of the training population 10 (see FIG. 1). The texture features are computed using the operations 22, 24 in parallel with the processing of the training population 10. Optionally, the operation 24 is limited to computing only the statistically significant texture features that serve as input to the binary classifier 40. Similarly, the operation 22 can be limited to computing only those GLCMs from which the statistically significant texture features that serve as input to the binary classifier 40 are computed. This can reduce the computational complexity of the classification phase.

The statistically significant features computed from the images of the subject 44 are input to the classifier 40, which outputs a molecular feature classification value 46 for the subject 44. Typically, this value 46 is not a final medical result, e.g. the patient 44 is not diagnosed solely based on the molecular feature classification value 46. Rather, the value 46 is used in conjunction with other information (including molecular data directly determined from a biopsy of the patient 44, if such data are available) reviewed by a physician or other medical personnel to generate a diagnosis for patient 44.

In the illustrative example of FIGS. 1 and 2, the molecular feature is a binary feature, e.g. ER+ or ER−. It is also contemplated to employ the same processing to generate a classifier to classify a patient respective to a molecular feature having three or more possible values. As another variant, the molecular feature can be hierarchical in nature, e.g. breast cancer with various sub-types. In this case the multivariate analysis 36 suitably trains a hierarchical classifier. As yet another variant, it is contemplated to omit the univariate analysis 34, and to perform the multivariate analysis 36 respective to all image texture features generated by the operations 22, 24.

The classification task of FIG. 2 can optionally be performed for different lesions of the same patient. This can allow the physician to distinguish, e.g. malignant versus benign lesions in the same patient, a task which ordinarily would entail performing multiple biopsies to acquire a tissue sample from each lesion.

In illustrative FIG. 2, the classification task is performed by the same computer 14 as was used in the training phase (FIG. 1). Alternatively, the classification task can be performed by a different computer. For example, in one contemplated implementation the training task (FIG. 1) is performed at a commercial research laboratory, and the resulting classification task is implemented as a non-transitory storage medium storing instructions executable by a computer to perform the processing operations 20, 22, 24 and the classifier 40. The training system (FIG. 1) can similarly be implemented as a non-transitory storage medium. The non-transitory storage medium may, for example, include: a hard disk drive or other magnetic storage medium; a random access memory (RAM), read-only memory (ROM), flash memory, or other electronic storage medium; an optical disk or other optical storage medium; various combinations thereof; or so forth. It is also to be appreciated that the computer 14 may be implemented as a "cloud" computer comprising a network of computers.

The disclosed integrated phenotyping processing extracts and ranks imaging features (e.g. texture-based) and associates these features with a molecular feature, so that: 1) in absence of molecular features, probability of a certain molecular feature can be inferred and 2) if information on molecular features from biopsy data are available, then the imaging and biopsy together can give a fuller picture of the subtype of the tumor and predict response to therapy. The disclosed integrated phenotyping processing employs non-invasive imaging texture features derived from routine clinical imaging workflow to characterize the molecular nature of tumor biology and disease and guide clinical management. It provides a methodology for dissecting both the clinical phenotype in-vivo and the molecular basis of disease on a genome-wide level.

In the following, an actually performed example of the disclosed integrated phenotyping processing is described.

In the training phase (corresponding to FIG. 1), imaging data of the subjects of the training population 10 were preprocessed (operation 20), including quantization of the intensities of the images into a reduced number of discrete gray levels. The GLCM calculation 22 was performed as follows. For two-dimensional (2D) analysis on each of the lesion sub-images, four different directional GLCMs were computed. For three-dimensional (3D) analysis on each of the lesion sub-volumes, thirteen different directional GLCMs are computed.

The texture features computation 24 was performed as follows. For 2D analysis both Haralick texture feature set and the Tamura texture feature set were calculated. For the 3D analysis only Haralick texture feature set was calculated. The Haralick and Tamura features used in this example are listed in Tables 1 and 2. See Haralick et al., "Textural Features for Image Classification", IEEE Transactions on Systems, Man and Cybernetics vol. SMC-3 No. 6 pp. 610-621 (1973); Howarth et al., "Evaluation of Texture Features for Content-Based Image Retrieval", P. Enser et al. (Eds.): CIVR 2004, LNCS 3115, pp. 326-334 (2004).

Based on the annotations of the patients (e.g. histopathological data, subtype-labelling using RNA sequencing data and therapy response) two subgroups of patients were created: ER+ (corresponding to the group 30 with the molecular feature), and ER− (corresponding to the group 32 without the molecular feature).

TABLE 1

Haralick image texture features used in the illustrative example.

| Visual texture characteristic features |
|---|
| 1. Angular second moment/energy |
| 2. Contrast |
| 3. Correlation |
| Statistical features |
| 4. Inverse difference moment |
| 5. Variance/sum of squares |
| 6. Sum average |
| 7. Sum variance |
| 8. Difference variance |
| Information theory features |
| 9. Entropy |
| 10. Sum entropy |
| 11. Difference entropy |
| Correlation features |
| 12. Information measures of correlation (A) |
| 13. Information measures of correlation (B) |
| 14. Maximal correlation coefficient |

TABLE 2

Tamura image texture features used in the illustrative example.

| 1. Coarseness |
|---|
| 2. Contrast |
| 3. Directionality (diagonal moment) |
| 4. line-likeness |
| 5. Regularity |
| 6. Roughness |

The univariate analysis 34 was performed as follows. The Wilcoxon rank-sum test was used as the statistical significance test to detect the MR image texture features that distinguish between the two classes 30, 32 of images in a statistically significant manner. Tables 3-6 present the p-values for the identified significant features discriminating hormone receptor, subtype and response status. In these tables, the p-value can be roughly understood to be the probability that the ER+ and ER− groups would exhibit the observed (statistical) difference in the image texture feature under analysis under the null hypothesis that the image texture feature under analysis has no correlation with the ER status. Thus, a smaller p-value indicates the null hypothesis is less likely, and conversely that it is more likely that the observed (statistical) difference in the image texture feature under analysis is actually statistically significant. In short, image texture features with smaller p-values are considered more statistically significant than image texture features with larger p-values.

TABLE 3

Subtype classification using univariate texture features where patients were grouped into basal and luminal groups according to RNA-seq interpretations of the PAM50 gene set.

| Image texture feature | P-value (Wilcoxon-test based) |
|---|---|
| Contrast range | 3.8222045e−002 |
| Correlation range. | 3.8222045e−002 |
| Sum Entropy range. | 4.5014828e−002 |
| First Diagonal Moment. | 4.5014828e−002 |
| Difference Average range. | 4.5014828e−002 |

Table 4 lists significant image texture features generated from images of breast lesions for determining the estrogen receptor value (ER+ versus ER−). In Table 4, the p-values range from a lowest value of p=0.001614 (for the sum variance range image texture feature) to a high value of p=0.04720 (for the sum variance mean image texture feature). This is more than an order of magnitude difference in p-value, indicating a strong difference in correlation of the various image texture features. Moreover, the p-values for the most statistically significant texture features are all small. The p-values of all significant image texture features listed in Table 3 satisfy a significance level threshold $\alpha=0.05$ (where $p<\alpha$ is defined as statistically significant), and 11 features would satisfy a more strict threshold of $\alpha=0.01$.

TABLE 4

Image texture features determined to be statistically significant for distinguishing between ER+ and ER− patients

| Image texture feature | p-value for distinguishing ER+ versus ER− |
|---|---|
| Angular second moment mean. | 2.5877890e−002 |
| Contrast mean. | 1.4397461e−002 |
| Contrast range | 6.1552810e−003 |
| Correlation mean. | 1.0200966e−002 |
| Correlation range. | 5.3019325e−003 |
| Inverse Difference Moment mean. | 9.5062099e−003 |
| Inverse Difference Moment range. | 1.9050751e−003 |
| Sum Average range. | 4.2028473e−002 |
| Sum Variance mean. | 4.7195919e−002 |
| Sum Variance range. | 1.6141074e−003 |
| Entropy mean. | 2.5877890e−002 |
| Difference Variance mean. | 2.0048445e−002 |
| Difference Variance range. | 1.2564117e−002 |
| Difference Entropy mean. | 1.4397461e−002 |
| Difference Entropy range. | 1.2564117e−002 |
| Information measures of Correlation1 mean. | 1.3453215e−002 |
| Information measures of Correlation1 range. | 2.5877890e−002 |
| Information measures of Correlation2 mean. | 8.2419995e−003 |
| Information measures of Correlation2 range. | 4.2211601e−003 |
| Difference Average mean. | 1.3453215e−002 |
| Difference Average range. | 4.5569104e−003 |
| Coarseness. | 3.3441521e−003 |
| Roughness. | 3.3441521e−003 |
| First Diagonal Moment. | 9.5062099e−003 |
| Fractal Dimension. | 1.1727442e−002 |

Table 5 lists significant image texture features generated from images of breast lesions for determining the progesterone receptor value (PR+ versus PR−). In Table 5, the p-values range from a lowest value of p=0.0003730 (for the sum variance range image texture feature) to a high value of p=0.04362 (for the regularity image texture feature). This is more than two orders of magnitude difference in p-value, and again the p-values for the most statistically significant texture features all satisfy significance level threshold $\alpha=0.05$, and 20 features would satisfy the more strict threshold $\alpha=0.01$.

TABLE 5

Image texture features determined to be statistically significant for distinguishing between PR+ and PR− patients

| Image texture feature | p-value for distinguishing PR+ versus PR− |
|---|---|
| Angular second moment mean. | 1.7100932e−002 |
| Contrast mean. | 6.3927648e−003 |
| Contrast range | 1.4148599e−003 |
| Correlation mean. | 3.4714625e−003 |
| Correlation range. | 1.5394322e−003 |
| Inverse Difference Moment mean. | 4.7317301e−003 |
| Inverse Difference Moment range. | 1.2996409e−003 |
| Sum Variance mean. | 1.1365007e−002 |
| Sum Variance range. | 3.7304530e−004 |
| Entropy mean. | 1.5996859e−002 |
| Difference Variance mean. | 8.5611762e−003 |
| Difference Variance range. | 2.9635678e−003 |
| Difference Entropy mean. | 6.3927648e−003 |
| Difference Entropy range. | 1.9762702e−003 |
| Information measures of Correlation1 mean. | 5.9344521e−003 |
| Information measures of Correlation1 range. | 5.1055964e−003 |
| Information measures of Correlation2 mean. | 3.2083679e−003 |
| Information measures of Correlation2 range. | 1.5394322e−003 |
| Difference Average mean. | 5.1055964e−003 |
| Difference Average range. | 1.4148599e−003 |
| Coarseness. | 3.2083679e−003 |
| Directionality. | 3.8772514e−002 |
| Line likeness. | 2.3682156e−002 |
| Regularity. | 4.3624638e−002 |
| Roughness. | 3.2083679e−003 |
| First Diagonal Moment. | 3.2083679e−003 |
| Fractal Dimension. | 4.0573917e−002 |

In Table 6, it is demonstrated that significant image texture features can be correlated with molecular features related to therapy response.

Furthermore, image features may be associated with biomolecular pathway deregulation, assessed by mutations, copy number polymorphisms, epigenetic marks, gene transcripts and noncoding transcripts. In one example, molecular analysis has identified a gene signature for TGF-β pathway activity. Univariate analysis was performed on the texture features of the same group of patients used in generating this signature, and identified the texture feature 'Angular second moment range' to be discriminative of patients with TGF-β pathway activity up or down (p=0.0002). This is an embodiment of how texture features can serve as surrogates of pathway-based molecular features and impact clinical decision making. Other pathways may be considered, for example phosphatidylinositol 3-kinase (PI-3K)/Akt pathway, Jak-STAT pathway and others

TABLE 6

Image texture features determined to be statistically significant for therapy response to Human Epidermal Growth Factor Receptor 2, Her2− and Her2+ patients

| Image texture feature | p-value for distinguishing responsive versus non-responsive on HER2− | p-value for distinguishing responsive versus non-responsive on HER2+ |
|---|---|---|
| Entropy range. | 3.6249871e−002 | |
| Regularity. | | 1.8163018e−002 |

In the actually performed example, to determine the appropriate number of gray level quantization and GLCM distance (i.e. offset) for generating the GLCMs (operations 20, 22 of FIG. 1), an array of different values was used to generate different GLCM matrices, and the consistency of the number of significant features was evaluated. Said another way, in some embodiments the processing operations 20, 22, 24, 34 are iterated to optimize the gray level quantization and GLCM offset (and, optionally, the GLCM spatial arrangement) to generate image texture features with sufficient statistical significance.

Although the univariate analysis 34 identifies statistically significant correlations between molecular features and image texture features, it provides no first-principles understanding of why such correlations exist for certain molecular feature-image texture feature pairs. Investigation of the first-principles basis of these correlations may be of substantial value; however, the disclosed integrated phenotyping techniques suitably operate on an empirical basis and do not rely upon a first-principles understanding of the underlying source of such correlations. It is sufficient to recognize (as disclosed herein) that such correlations exist, and to utilize suitable statistical significance analysis (or another tool such as a genetic algorithm) to identify such correlations, and to generate the molecular feature classifier 40 based on the identified correlations.

Multiple hypothesis testing correction can also be performed. Additionally, to establish accuracy and robustness of significant features, the image texture features may be computed for non-lesion image regions to verify that the statistically significant features are not observed in these non-lesion regions. As another qualification operation, the significant image texture features can be computed for different image slices through the lesion to determine whether the observation of the significant image texture features is dependent upon slice orientation and/or location through the lesion. Statistically significant features that are not observed throughout the lesion are generally not preferred for use in the classifier 40; however, significant features that are consistently observed throughout the lesion, but only for a certain slice orientation (e.g., only for axial slices but not for coronal or sagittal slices) can be used with the limitation that the feature only be an input to the classifier 40 for the observed slice orientation (e.g., only axial slices).

The disclosed integrated phenotyping techniques can generate associations between image texture features and various molecular features such as: association with genomic sub-types; association with individual genes (for each individual significantly differentially expressed gene); association with whole gene pathway activation (for each pathway that shows statistically significant enrichment of differentially expressed genes with for example hypergeometric test); association with noncoding RNAs (microRNAs and long noncoding RNAs); and so forth. For example, association can be made with TGFbeta pathway, PI3K/AKT/mTOR pathway.

A further example of the classification phase (FIG. 2) is next described. Post-contrast fat-compressed, motion-corrected magnetic resonance (MR) images are acquired of the patient 44. (Again, it is to be understood that more generally the disclosed integrated phenotyping techniques may be employed in a veterinary context, in which cast the patient 44 would instead by a dog, cat, or other veterinary subject). In the operation 22, one or more GLCMs are computed based on the patient image, and the image texture feature values are computed as per operation 24. In one suitable classification process (i.e., classifier 40), the log2 fold-change values are determined of the image texture features between subgroups of a category (e.g. ER+ vs. ER−). The centroid for the two subgroups is computed based on the significance-adjusted log2 fold change values, and the patient 44 is assigned into the group associated with the nearest centroid.

The illustrative embodiments pertain to non-invasively determining the ER status of a patient. More generally, the disclosed integrated phenotyping techniques can test for the presence/behavior of any hormone receptor or genome signature (e.g. to determine molecular subtype, therapy response, et cetera).

Moreover, while the illustrative embodiments employ magnetic resonance (MR) imaging, it is expected that the disclosed integrated phenotyping techniques will be applicable to associate molecular features with image texture features of images acquired by other modalities such as computed tomography (CT). This is a reasonable expectation since the observed molecular feature-MR image texture feature correlations indicates that malignant lesions exhibit small-scale spatial structure on a scale that can be captured by MR imaging, and other imaging modalities such as CT have similar spatial resolution. Differences in contrast mechanisms between different imaging modalities (e.g., MR versus CT) may result in differences in (e.g., enhancement of, or partial or total suppression of) certain texture features in images of certain imaging modalities, and moreover imaging parameters and/or the use of an exogenous contrast agent are also expected to impact what image texture features are exhibited in a given medical image of a lesion acquired by a given imaging modality. Nonetheless, the empirical and modality-independent nature of the disclosed integrated phenotyping approaches facilitates identification and exploitation of correlations between a molecular feature of interest and whichever image texture features manifest in a given imaging modality with given imaging conditions.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A non-transitory storage medium storing instructions executable by an electronic data processing device to perform a method including:
   computing image texture feature values for a set of image texture features from a magnetic resonance (MR) image of a breast lesion in a subject, the computing including:

computing one or more gray level co-occurrence matrices (GLCMs) for the MR image of the breast lesion in the subject; and computing the image texture feature values based on the one or more GLCMs; and classifying the subject respective to a molecular feature of interest based on the image texture feature values computed for the set of image texture features and a spatial structure of the set of image texture features;

wherein molecular feature of interest is an estrogen receptor (ER) marker, an progesterone receptor (PR) marker, a Human Epidermal Growth Factor Receptor 2 (Her2) marker, or a deregulation of the TGFbeta pathway.

2. The non-transitory storage medium as set forth in claim 1, wherein the computing one or more GLCMs includes computing one or more symmetrized and normalized GLCMs for the MR image of the breast lesion in the subject.

3. The non-transitory storage medium as set forth in claim 1, wherein the computing of the image texture feature values further includes quantizing the gray levels of the MR image of the breast lesion in the subject before computing the one or more GLCMs.

4. The non-transitory storage medium as set forth in claim 1, wherein the computing one or more GLCMs includes computing two or more GLCMs having at least one of (1) different offsets and (2) different spatial arrangements.

5. The non-transitory storage medium as set forth in claim 1, wherein the set of image texture features includes Haralick image texture features and/or includes Tamura image texture features.

6. The non-transitory storage medium as set forth in claim 1, wherein the method further comprises:

computing reference image texture feature values for at least the set of image texture features from MR images of breast lesions in reference subjects of a reference population;

dividing the reference image texture feature values into different population groups representing different values of the molecular feature of interest based on known values of the molecular feature of interest for the reference subjects; and training a classifier used in the classifying to distinguish between the different population groups based on the reference image texture feature values.

7. The non-transitory storage medium as set forth in claim 6, wherein the reference image texture feature values are computed for a superset of image texture features containing the set of image texture features, and the training comprises:

performing univariate analysis to quantify the statistical significance of each image texture feature of the superset of image texture features for distinguishing between the different population groups; and selecting the set of image texture features as a'subset of the superset of image texture features having the highest statistical significance.

8. The non-transitory storage medium as set forth in claim 1, wherein the molecular feature of interest is a gene, a group of genes, a gene pathway activation, a noncoding RNA, or multiple non-coding RNAs.

9. An apparatus comprising:

a non-transitory storage medium as set forth in claim 1; and an electronic data processing device configured to execute instructions stored on the non-transitory storage medium.

10. A non-transitory storage medium storing instructions executable by an electronic data processing device to perform a method including:

computing image texture feature values for a set of image texture features from an image of an anatomical feature of interest in a subject; and classifying the subject respective to a molecular feature of interest based on the image texture feature values computed for the set of image texture features and a spatial structure of the set of image texture features;

wherein the method further comprises:

computing reference image texture feature values for at the set of image texture features from images of the anatomical feature of interest in reference subjects of a reference population;

dividing the reference image texture feature values into different population groups representing different values of the molecular feature of interest based on known values of the molecular feature of interest for the reference subjects; and training a classifier used in the classifying to distingpish between the different population groups based on the reference image texture feature values;

wherein the reference image texture feature values are computed for a superset of image texture features containing the set of image texture features, and the training comprises:

performing univariate analysis to quantify the statistical significance of each image texture feature of the superset of image texture features for distinguishing between the different population groups; and selecting the set of image texture features as a subset of the superset of image texture features having the highest statistical significance;

wherein the univariate analysis comprises performing a Wilcoxon rank-sum test or a student-t test to quantify the statistical significance.

11. A method comprising:

computing reference image texture feature values for a plurality of image texture features from images of an anatomical feature of interest in human reference subjects of a reference population;

dividing the reference image texture feature values into different population groups representing different values of a molecular feature of interest based on known values of the molecular feature of interest for the reference subjects;

training a classifier to distinguish between the different population groups based on the reference image texture feature values and spatial structures of the set of reference image texture features, acquiring a medical image of the anatomical feature of interest in a patient using medical imaging of the patient;

computing patient texture feature values for the plurality of image texture features from the medical image of the anatomical feature of interest in the patient; and applying the trained classifier to the patient texture feature values to output a molecular feature classification value for the molecular feature of interest for the patient;

wherein the computing of reference image texture feature values, dividing, training, computing of patient texture feature values, and applying are performed by an electronic data processing device.

12. The method of claim 11, further comprising:
(i) computing image texture feature values for at least some of the plurality of image texture features from an image of the anatomical feature of interest in a test subject; and
(ii) classifying the test subject respective to the molecular feature of interest using the trained classifier;
wherein the operations (i) and (ii) are performed by the electronic data processing device.

13. The method as set forth in claim 11, wherein the computing of the image texture feature values comprises:
computing one or more gray level co-occurrence matrices (GLCMs) for the image of the anatomical feature of interest in the subject; and
computing the image texture feature values based on the one or more GLCMs.

14. The method as set forth in claim 13, wherein the computing one or more GLCMs includes computing one or more symmetrized and normalized GLCMs for the image of the anatomical feature of interest in the subject.

15. The method as set forth in claim 13, wherein the computing of the image texture feature values further includes quantizing the gray levels of the image of the anatomical feature of interest in the subject before computing the one or more GLCMs.

16. The method as set forth in claim 13, wherein the computing one or more GLCMs includes computing two or more GLCMs having at least one of (1) different offsets and (2) different spatial arrangements.

17. The method as set forth in claim 11, wherein the reference image texture feature values are computed for a superset of image texture features containing the set of image texture features, and the training comprises:
performing a Wilcoxon rank-sum test or a student-t test to quantify the statistical significance to quantify the statistical significance of each image texture feature of the superset of image texture features for distinguishing between the different population groups; and
selecting the set of image texture features as a subset of the superset of image texture features having the highest statistical significance.

* * * * *